Aug. 31, 1965    G. M. MEJLSO    3,203,655
CABLE HOLDING DEVICE

Filed Aug. 27, 1963    2 Sheets-Sheet 1

INVENTOR:
GEORGE MONTAGUE MEJLSO,
By Gordon McLean
ATT'Y.

Aug. 31, 1965  G. M. MEJLSO  3,203,655
CABLE HOLDING DEVICE

Filed Aug. 27, 1963  2 Sheets-Sheet 2

INVENTOR:
GEORGE MONTAGUE MEJLSO,
BY
ATT'Y.

United States Patent Office 3,203,655
Patented Aug. 31, 1965

3,203,655
CABLE HOLDING DEVICE
George Montague Mejlso, Hounslow, England, assignor to United-Carr Incorporated, a corporation of Delaware
Filed Aug. 27, 1963, Ser. No. 304,751
Claims priority, application Great Britain, Sept. 6, 1962, 34,225/62
2 Claims. (Cl. 248—68)

The present invention relates to an improved cable holding device which is particularly, although not exclusively suitable for use in attaching a plurality of cables or wires in an orderly manner on a fixed framework.

In many present day electronic devices the electrical circuits involved require a great number of connecting wires or cables. These connecting wires or cables are often confined within a relatively small space and if they are not arranged and held in an orderly and convenient manner they tend to obstruct an engineer or technician working on the electronic device.

It is an object of the present invention to overcome this problem by providing a device which may be used to attach single cables or groups of cables in a spaced and orderly manner to a framework thus preventing the cables from becoming entangled and presenting an improved layout which is relatively easy to work or maintain.

According to the invention there is provided a cable holding device comprising an elongate holder having a recessed base and two upstanding end walls and a resilient insert seated in the recess in the base and having a plurality of pairs of upstanding arms extending transversely of the holder and between each pair of which a cable or cables may be located.

Figures 1, 2:
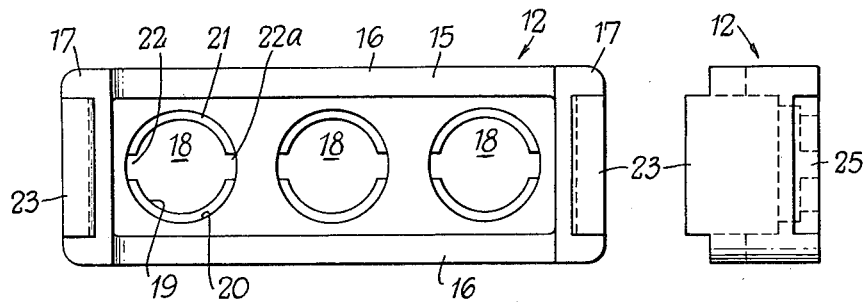
Figure 3:
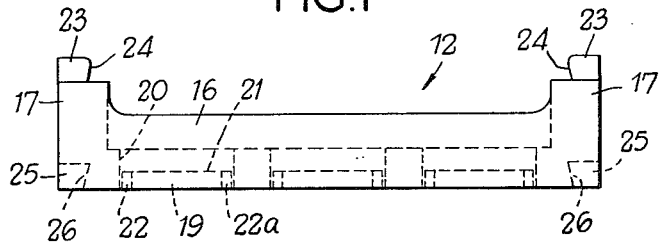
Figure 4:
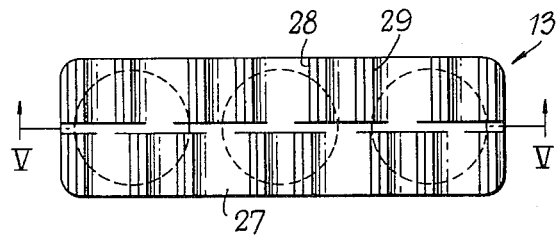
Figure 5:
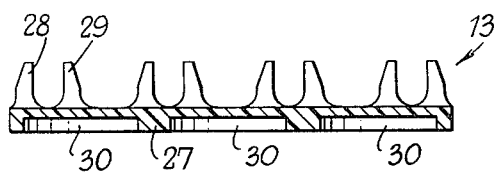
Figure 6:
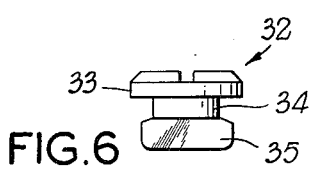
Figure 7:
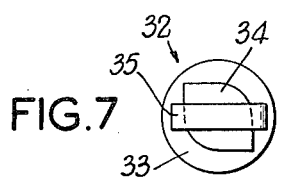
Figure 8:
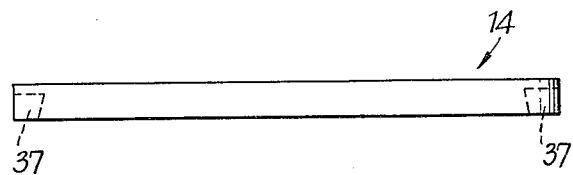
Figure 9:
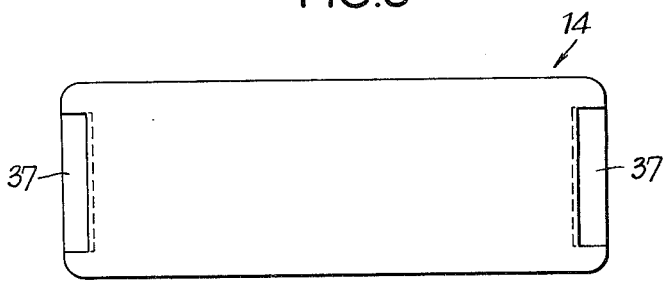

A preferred form of the invention will now be described with reference to the diagrammatic drawings, in which:

FIGURES 1, 2 and 3 are respectively a plan, end elevation and side elevation of a holder forming part of the device according to the invention, FIGURE 4 is a plan view of a cable holding insert, FIGURE 5 is a section on the V—V of FIGURE 4, FIGURES 6 and 7 are respectively a side elevation and underplan of a turn-button, FIGURES 8 and 9 are respectively a side elevation and underplan of a lid for use with the holder of FIGURES 1 to 3, and FIGURE 10 is a side elevation, partly in section showing the device according to the invention attaching a plurality of cables to an apertured framework.

Figure 10:
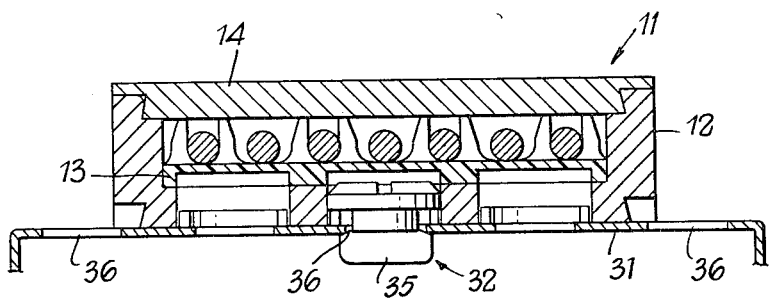

The cable holding device according to the present invention is indicated generally at 11 in FIGURE 10.

The device 11 comprises a holder, indicated at 12 in FIGURES 1 to 3, a resilient cable holding insert which is indicated at 13 in FIGURES 4 and 5 and a lid 14 which is shown in FIGURES 8 and 9.

The holder 12 is preferably formed from a hard synthetic plastics material, such as polystyrene, and has a recessed base 15, side walls 16 and raised end walls 17.

The base 15 has three similar apertures 18 each of which comprises a through bore 19 and counter bore 20 of slightly larger diameter than the through bore 19, which thus forms a step 21.

Diametrically opposed slots 22, 22a are formed in the wall of each through bore 19.

Each raised end wall 17 has an upstanding projection in the form of a rib 23 on its upper surface which is also formed with an overhanging inner edge 24.

A recess 25 is formed in the under-surface of each end wall 17. Each recess is formed with an undercut edge 26 and is shaped to accommodate a rib 23 in snap-engagement therein.

The cable-holding insert 13 is preferably formed from a relatively resilient synthetic plastics material such as a soft polyvinylchloride and comprises a body 27 on the upper side of which are two rows of transversely extending cable engaging arms 28 and 29.

The arms 28 and 29 are arranged in pairs and the pairs in one row are in staggered relationship with the pairs in the other row as can be seen from FIGURE 4.

Three similar circular recesses 30 are formed in the under surface of the body 27 which is adapted to seat in the holder 12 so that the recesses 30 are positioned over the apertures 18 in the base of the holder, as shown in FIGURE 10.

In use the holder 12, as shown in FIGURE 10, is attached to an apertured support panel 31 by means of a turn-button 32 which is shown in FIGURES 6 and 7.

The turn-button 32 comprises a head 33 formed with a slot for the reception of a screw-driver, a neck 34 which is lanceolate in cross-section and a rectangular nose 35. As shown in FIGURE 7 the dimensions of the neck 34 and nose 35 are such that they are circumscribed by circles of equal radii.

The panel 31 is part of a standard electrical mounting channel having a plurality of elongate apertures or slots 36.

To attach the holder 12 to the apertured panel 31 the rectangular nose 35 of the turn-button is passed through the centre aperture 18 in the base of the holder, the nose 35 passing through the slots 22, 22a, and through one of the slots 36 formed in the panel 31 so that the neck 34 of the turn-button extends through the base of the holder and through the slot 36 in the panel. The turn-button 32 is then rotated so that the nose 35 engages the undersurface of the panel 31 to retain the holder on the panel.

The dimensions of the turn-button are such that the neck 34 will pass freely through the slot 36 when the nose 35 is aligned in the longitudinal direction of the slot and when located through the slot will rotate in one direction only and to a limited extent. In order for the turn button to function correctly the neck 34 must be freely rotatable in the bore 18 in the holder and the width of the slot 36 in the support panel must be slightly greater than the diameter of a circle drawn within the lanceolate configuration of the neck 34; the circle having its circumference superimposed on the two arcuate portions between the two apexes of the neck 34. In use the nose portion 35 is aligned along the length of the slot and passed down through the bore 18 and slot 36 in the support panel. When the nose portion 35 has passed through the support panel the turn button is rotated through 90° so that the ends of the nose portion 35 overlie the edges of the slot 36.

Thus the turn-button 32 cannot be overturned and when in the locked position is held firmly in place.

The three apertures 18 in the holder 12 enable the holder to be attached to the panel 31 by one or more turn-buttons 32 at a time, depending on the strength of the hold required. They are also positioned in the base of the holder to match the spacing of the slots 36 in the panel 31 so that the holder may be secured to the panel in any annular position required. It will be apparent that the spacing of the slots 36 in the support panel can be so arranged that a holder can be attached to the panel at right angles across to the slots in parallel with the slots or inclined at an angle to the general direction of the slots.

If desired the turn-button 32 may be replaced by a conventional fastening device such as, for instance, a screw or bolt.

When the holder has been secured to the panel 31 the cable-holding insert 13 is pressed home into the recess in the base of the holder, as shown in FIGURE 10 so that the arms 28, 29 project above the side walls 16.

The cables to be secured are then laid across the holder 12 and engaged between the arms 28, 29 so as to pass through the holder and be held in spaced relationship therein.

Finally the lid 14, which is formed with recesses 37 similar to the recesses 25 is pressed on to the top of the holder 12 so that the ribs 23 snap-engage into the recesses 37 to hold the lid 14 securely in position.

If there are more cables than can be accommodated in one holder a second holder 12 is pressed onto the top of the first so that the ribs 23 in the first holder snap-engage into the recesses 25 in the second holder. A second layer of cables can then be arranged across the second holder in the manner described above.

It will be seen that any number of holders may be attached one above the other in the above described manner so as to provide a device having several tiers which will accommodate a great number of cables which may, if desired be grouped in any convenient arrangement.

The cable holding device 11 can be dismantled and re-assembled quickly and easily without damage and thus provides a flexible and simple means for holding and grouping a plurality of cables on a panel.

What I claim is:

1. A cable holding device comprising an elongated holder and a resilient insert, the holder having a recessed base and two upstanding end walls, the resilient insert having a plurality of pairs of cable-holding arms and said insert being seated in said recessed base with said arms extending transversely of the holder and each of said end walls having formed, at its top and bottom edges respectively, engageable male and female portions so that a plurality of the said devices may be mounted one on top of the other.

2. A cable holding device comprising an elongated holder having a base, two upstanding side walls and two upstanding end walls of greater height than the side walls, the resilient insert having a plurality of pairs of cable-holding arms, the resilient insert being seated on the base and between the four said walls with the arms extending transversely of the holder.

References Cited by the Examiner

UNITED STATES PATENTS

| 1,820,667 | 8/31 | Leyes | 85—1 |
| 2,260,048 | 10/41 | Newell | 174—138 |
| 2,650,948 | 9/53 | Findlay | 174—168 |
| 2,737,204 | 3/56 | La Bonte | 138—77 |
| 2,932,687 | 4/60 | Cook | 174—117 |
| 2,998,217 | 8/61 | Englis et al. | 248—74 |

FOREIGN PATENTS

| 811,116 | 8/51 | Germany. |
| 922,967 | 4/63 | Great Britain. |

CLAUDE A. LE ROY, *Primary Examiner.*